(12) United States Patent
Jonsson (10) Patent No.: US 10,901,382 B2
(45) Date of Patent: Jan. 26, 2021

(54) COMMISSIONING SMART LIGHTING SYSTEMS

(71) Applicant: TRIDONIC GMBH & CO KG, Dornbirn (AT)

(72) Inventor: Karl Jonsson, Rancho Santa Margarita, CA (US)

(73) Assignee: TRIDONIC GMBH & CO KG, Dornbirn (AT)

( * ) Notice: Subject to any disclaimer, the term of this patent is extended or adjusted under 35 U.S.C. 154(b) by 314 days.

(21) Appl. No.: 15/895,000

(22) Filed: Feb. 13, 2018

(65) Prior Publication Data

US 2019/0250575 A1      Aug. 15, 2019

(51) Int. Cl.
| | |
|---|---|
| *G06F 15/177* | (2006.01) |
| *G05B 19/042* | (2006.01) |
| *G06F 16/28* | (2019.01) |
| *G06F 16/22* | (2019.01) |
| *H04L 12/28* | (2006.01) |

(Continued)

(52) U.S. Cl.
CPC ....... *G05B 19/042* (2013.01); *G06F 16/2228* (2019.01); *G06F 16/284* (2019.01); *H04L 12/2807* (2013.01); *H05B 47/155* (2020.01); *H05B 47/18* (2020.01); *H05B 47/185* (2020.01); *H05B 47/19* (2020.01); *G05B 15/02* (2013.01); *G05B 2219/25011* (2013.01)

(58) Field of Classification Search
CPC .. G05B 19/042; G06F 16/284; G06F 16/2228
USPC ................................................. 709/203, 220
See application file for complete search history.

(56) References Cited

U.S. PATENT DOCUMENTS

| | | | |
|---|---|---|---|
| 9,949,331 B1* | 4/2018 | Coombes | ............... H05B 45/10 |
| 2015/0331969 A1* | 11/2015 | Dahlen | ................... G06F 30/00 |
| | | | 703/1 |

(Continued)

FOREIGN PATENT DOCUMENTS

| | | | | |
|---|---|---|---|---|
| EP | 2 884 355 | | 6/2015 | |
| EP | 2884355 A1 * | | 6/2015 | ........... G05B 19/042 |

(Continued)

OTHER PUBLICATIONS

European search report dated Jul. 15, 2019 in co-pending European Patent application 19155666.1

*Primary Examiner* — Duyen M Doan
(74) *Attorney, Agent, or Firm* — Andrus Intellectual Property Law (57) ABSTRACT

The commissioning of a smart building technology system is implemented with the use of a binding table in a relational database to bind one or more sections of virtual devices representing, e.g., lights, sensors, actuators and room controls, to the network addresses of physical devices. Plans for redundant sections in large building are created in terms of virtual devices and logical functions (such as programmed groups of devices, scenes and recipes) without direct binding to physical devices. Software creates reference copies of the plan for redundant sections the building, through use of a binding table, and attaches the reference copy to the location of the respective section on a master layout of the building. The plan modeled with virtual devices can be edited or reprogrammed across all reference copies, even after binding to physical devices and commissioning is completed.

14 Claims, 8 Drawing Sheets

(51) Int. Cl.
*H05B 47/18* (2020.01)
*H05B 47/19* (2020.01)
*H05B 47/155* (2020.01)
*H05B 47/185* (2020.01)
G05B 15/02 (2006.01)

(56) References Cited

U.S. PATENT DOCUMENTS

| | | |
|---|---|---|
| 2017/0016331 A1 | 1/2017 | Yaakoby |
| 2018/0054873 A1* | 2/2018 | Pandharipande ..... G01J 1/4204 |
| 2018/0279451 A1* | 9/2018 | Baus ...................... H05B 47/19 |
| 2019/0132932 A1* | 5/2019 | Klecha .................. H05B 45/60 |

FOREIGN PATENT DOCUMENTS

| | | |
|---|---|---|
| EP | 3 217 604 | 9/2017 |
| WO | 2015139877 | 9/2015 |
| WO | 2016050279 | 4/2016 |
| WO | 2016138549 | 9/2016 |
| WO | 2017025854 | 2/2017 |
| WO | 2017141127 | 8/2017 |
| WO | 2017153092 | 9/2017 |

* cited by examiner

FIG. 6A
Example: Data Entry - Reference Sections

| Section | Section Name | Virtual Device ID | Virtual Device Name | Physical Device ID |
|---|---|---|---|---|
| 1 | Room 101 | 1 | Desk lamp | 749375 |
| 1 | Room 101 | 2 | Motion Sensor | 983757 |
| 1 | Room 101 | 3 | Bathroom Light | 846582 |
| 2 | Room 102 | 1 | Desk lamp | 946583 |
| 2 | Room 102 | 2 | Motion Sensor | 549476 |
| 2 | Room 102 | 3 | Bathroom Light | 764583 |
| 3 | Room 103 | 1 | Desk lamp | 834758 |
| 3 | Room 103 | 2 | Motion Sensor | 885735 |
| 3 | Room 103 | 3 | Bathroom Light | 294725 |
| 4 | Room 104 | 1 | Desk lamp | 384753 |
| 4 | Room 104 | 2 | Motion Sensor | 385935 |
| 4 | Room 104 | 3 | Bathroom Light | 967365 |
| ... | ... | ... | ... | ... |

FIG. 6B
Example: Data Entry - Groups Relation to Sections or Reference SectionsExample: Data Entry - Reference Sections

| Section ID | Section Name | Group | Group Name | Virtual Device ID | Virtual Device Name | Physical Device ID |
|---|---|---|---|---|---|---|
| 1 | Room 101 | 1 | Reading Lights | 78 | Receding Light Left | 3457345 |
| 1 | Room 101 | 1 | Reading Lights | 79 | Receding Light Right | 3658539 |
| 2 | Room 102 | 1 | Reading Lights | 78 | Receding Light Left | 9573593 |
| 2 | Room 102 | 1 | Reading Lights | 79 | Receding Light Right | 3246247 |
| ... | ... | ... | ... | ... | ... | ... |

COMMISSIONING SMART LIGHTING SYSTEMS

FIELD OF THE INVENTION

The invention relates to commissioning lighting, sensors, actuators and control networks with software that is able to create reference copies of planned virtual devices and logical functions without direct binding to physical devices for redundant sections in large buildings and complexes. Reference copies can be applied to similar rooms or sections of the building or complex, and create a virtual layer which can be edited or reprogrammed across all reference copies, even after binding to physical devices and commissioning is completed.

BACKGROUND OF THE INVENTION

Commissioning, which is the process of associating a physical position of an installed building technology device (e.g. a luminaire, sensor, window shade actuator, or controller) with a logical (e.g. bus or network) address, is an essential step during the installation and setup of an intelligent lighting system. The commissioning step typically requires electric, electronic and/or software expertise by the staff installing the light system. This makes the installation costly due to the needed staff qualification. During the commissioning process, dedicated software is used to assign an address and/or a geographical position to building technology devices. Afterwards, a grouping of the building technology devices and/or an association with a work flow definition, e.g. a scene definition, is performed. The term commissioning is used generally to refer both to the programming of devices for dedicated behavior and to the programming for locating known devices in a community of networked devices.

Traditional commissioning methods consist of two phases. The first phase involves identifying a connected end point like a luminaire, sensor, actuator or controller to create a relation between a digital representation (like an IP network address, a DALI address or a network MAC address etc.) and the physical location where the device is located in a building relative to a floor plan or a hierarchy (e.g., Building->Floor->Room->Name). The second phase involves defining behavior between the input and output devices, such as defining a group of lights to turn on/off based on a dedicated wall switch, or adopt brightness and color temperature depending on time of day or ambient lighting detected from sensors. Depending on the system and the application software used, these two phases do not have to be implemented in a particular order.

One limitation of state of the art and emerging commissioning methods is that the step of programming behavior/ definition in second phase mentioned above needs to be implemented for every room or area in a building, which can be cumbersome and time consuming in large complexes like hotels and office buildings where the same room layout might be replicated many times. As an example, a hotel with 500 rooms might only have 3 room layouts (e.g., standard, premium and suite as an example). Commissioning each room individually is inevitable for the first phase of the commissioning process mentioned above (e.g., identifying a connected end point and creating a relation with a digital representation/address). However, the second phase mentioned above (e.g., defining behavior between the input and output devices) is quite redundant and in many cases troublesome. Commissioning each room individually, and in particular the second phase, can take a long time, is prone to errors and leads to difficulty when servicing after installation.

One object of the invention is to expedite the commissioning process. Other objects of the invention are to reduce the technical complexity of the commissioning process, reduce errors during the commissioning process and facilitate after service of lighting/sensor networks.

SUMMARY OF THE INVENTION

The invention is useful in building technology systems, particularly building technology systems for large buildings and complexes in which physical devices such as luminaires, sensors and room controllers as well as other types of physical devices are connected to an addressable data network. The building control system contains software programmed to manage the logical functions of the respective physical devices. For purposes of commissioning and control, the master layout of the building or complex is defined to have multiple sections such as rooms or areas of the building or complex. The invention is particularly helpful when the complex includes redundant sections, such as many similar rooms with similar lighting systems, e.g. standard sized rooms in a hotel, or individual offices in an office building.

The network addressable physical devices in the redundant sections of the complex e.g., lights, sensors, actuators such as window blind motors, room controllers or switch boxes, etc., each have a unique network address, such as an IP address or a MAC address. In order to facilitate commissioning of the network addressable physical devices among redundant sections of the complex, the system includes commissioning software configured to create a plan of virtual devices with programmed logical functions for sets of redundant sections. The virtual devices are selected to match the physical devices in or associated with the plan for the respective set of redundant sections. Programming of logical functions with virtual devices can occur prior to the building becoming available. The plan of virtual devices is applied via the commissioning software to each redundant section selected by the user. This process is referred herein as making a reference copy, which is understood to mean that a given section in the master layout is binded to a given plan of virtual devices.

The commissioning software enables the definition of additional plans of virtual devices for other redundant or non-redundant sections in the master layout. When spaces and physical devices in the master layout are covered by more than one section, the commissioning system implements a predetermined priority in case overlapping plans for respective sections contradict.

The commissioning software desirably includes a mirroring option that includes a given section in the set of redundant sections, even though the physical layout of the section is a mirror image of the section in the plan of virtual devices. The reference copy of the plan of virtual devices is applied to the section that is a mirror image, and the commissioning software is configured to bind the network address of identified physical devices to the virtual devices in the reference copy of the plan according to a mirror image layout of the section. In this manner, the section is managed the same as the other sections in the set of redundant sections.

With the plan prepared, the on-site steps of the commissioning process are implemented. To do this, a mobile commissioning device, such as tablet providing internet access to the commissioning software application, is configured to assist in identifying the location of network connected physical devices, e.g. acknowledging that a flickering light corresponds to a given virtual light in a given section (or overlapping sections) of the master layout. In turn, the commissioning software binds the appropriate virtual device in the respective reference copy for the section of the master layout to the physical device and to the network address of the physical device.

In an exemplary embodiment of the invention, the commissioning software uses a relational database to create reference copies of a plan of virtual devices and the programmed logical functions for the virtual devices, and also manage the binding of network addressable physical devices to virtual devices in each respective plan. For example, the relational database may include a binding table (M:M:M) that binds unique section ID keys to unique physical device ID keys and to virtual device ID keys. The section ID keys are unique for each section developed by the programmer on the master layout and are desirably computer generated whenever a new reference copy is created. In addition, each physical device has a unique ID key that uniquely identifies each physical device and its network address. When a physical device is identified by a technician as corresponding to a given virtual device in a given section on the master layout, the technician instructs the commissioning system to bind the physical and virtual devices in the section through the user interface on the mobile commissioning device. In turn, an appropriate entry is made in the binding table (M:M:M) of the relational database. Information about the user defined sections and the programming of the logical functions for the plans of virtual devices is also managed by the relational database.

When the commissioning process is completed, the building control system is provisioned based the binded section reference copies of virtual devices and logical functions and the binded physical devices and network addresses.

When commissioning large buildings or complexes with redundant network addressable physical devices, the invention is able to expedite the planning process through the use reference copies of plans of virtual devices and logical functions for sets of the redundant sections of the building or complex. It enables the editing and debugging of plans of virtual devices and their logical functions which in are applied globally to all reference copies. This ability reduces the technical complexity of the commissioning process, reduces errors during the commissioning process and facilitates service after the building system is operational.

DETAILED DESCRIPTION

Figure 1:
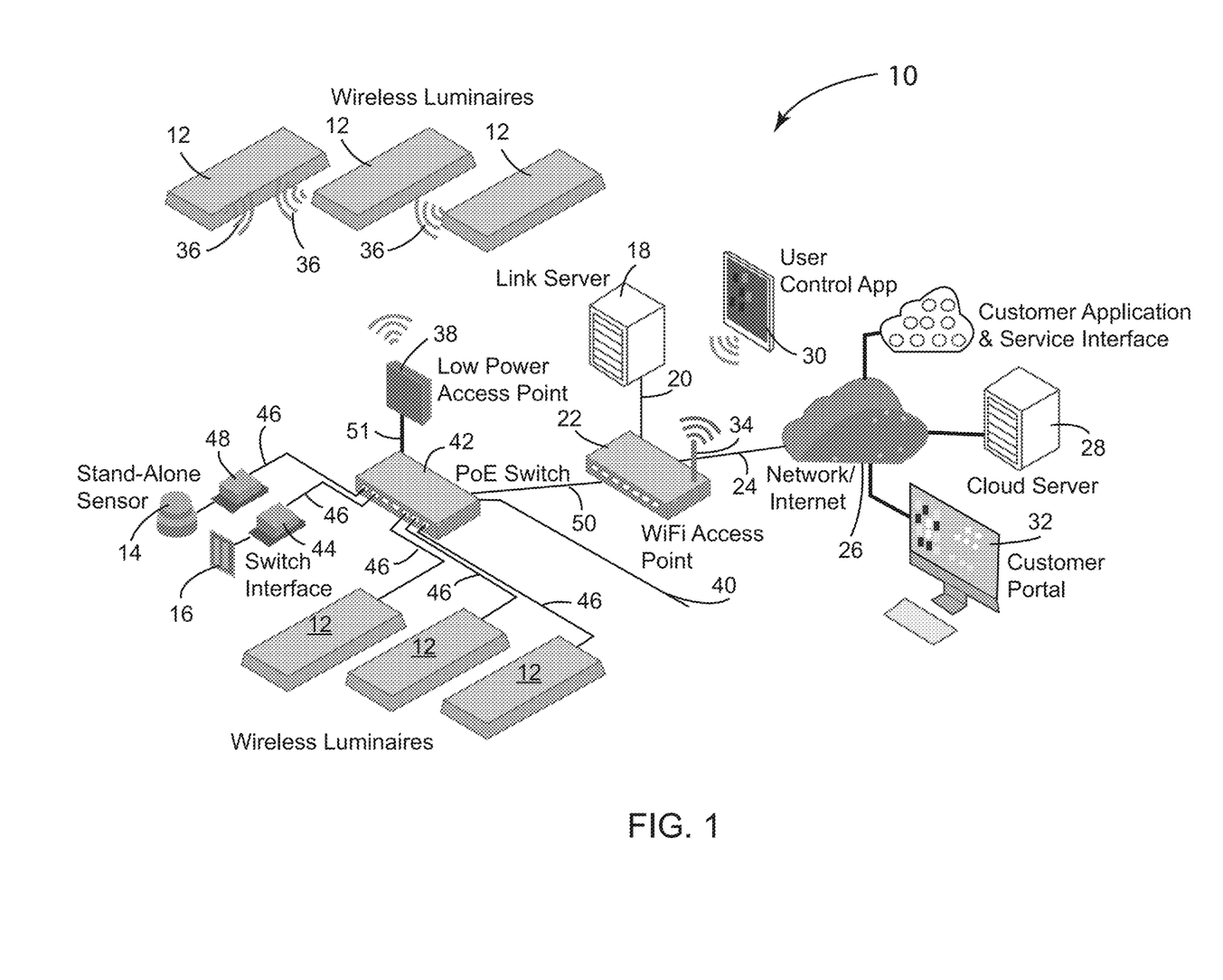
FIG. 1 illustrates exemplary building technology system having scalable, open network architecture for connecting luminaire modules to a local area data network and the internet.
Figure 3:
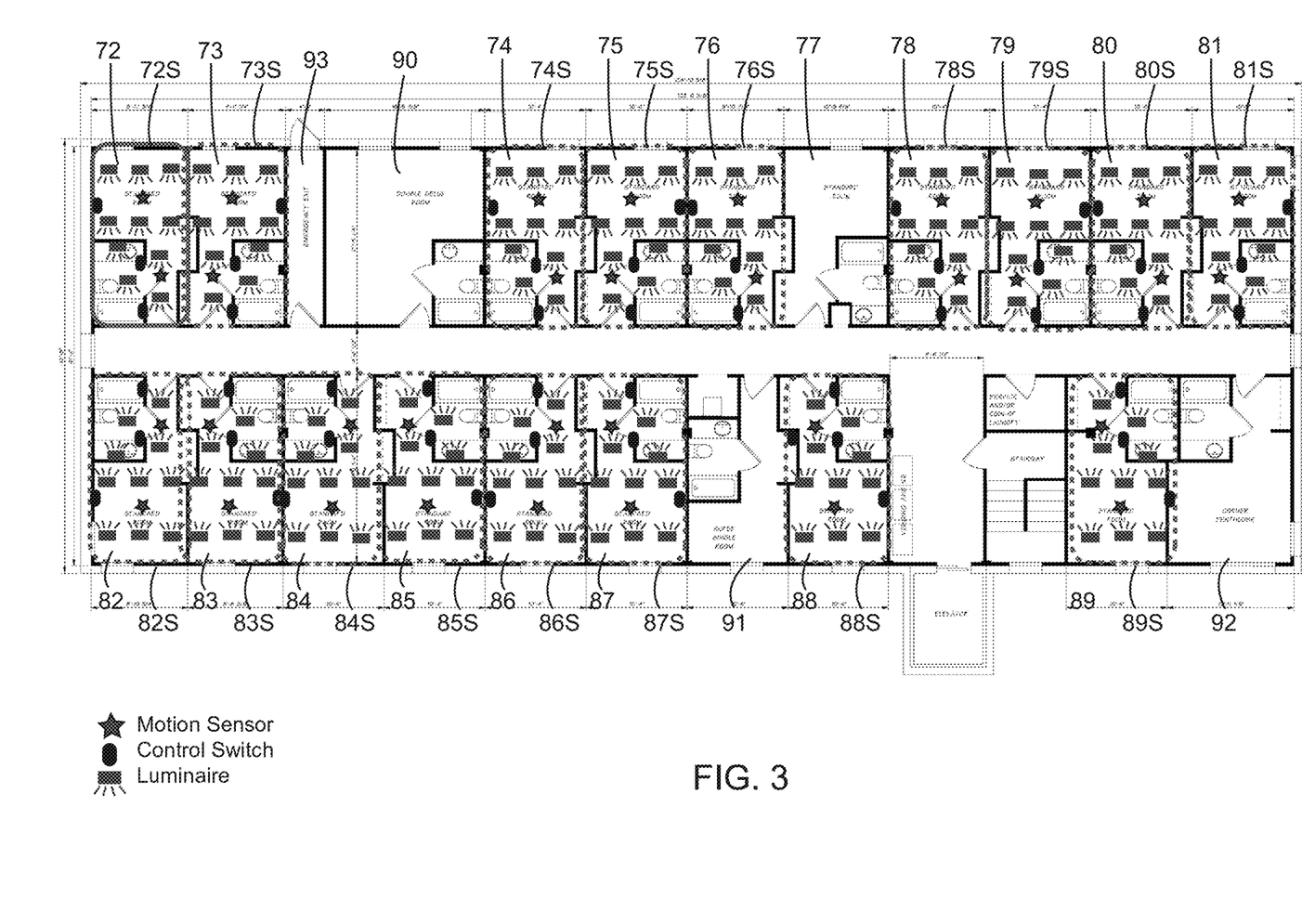
FIG. 3 is an exemplary master layout of a floor in a large building illustrating the use of sections and reference copies in accordance with one embodiment of the invention.

FIG. 1 illustrates a scalable building technology system 10 with an open network architecture that is suitable for implementing the invention. Luminaire modules 12, 12W, sensors 14, actuators and room controllers 16 are connected to a local area data network. Other types of physical devices besides those listed can be incorporated into the building technology system 10 as well. By way of example, the building technology system 10 can be a Net4More® IP lighting system sold by the assignee of the present application, Tridonic GmbH & Co. The Net4More® technology is an IPv6 based network platform. Tridonic application 16159921.2 and entitled "IoT communication module for a building technology device, bus device, a building technology device for IoT-networks, building technology communication system and building technology management system" discloses many aspects of the Net4More® technology and is hereby incorporated herein by reference.

Figure 2:
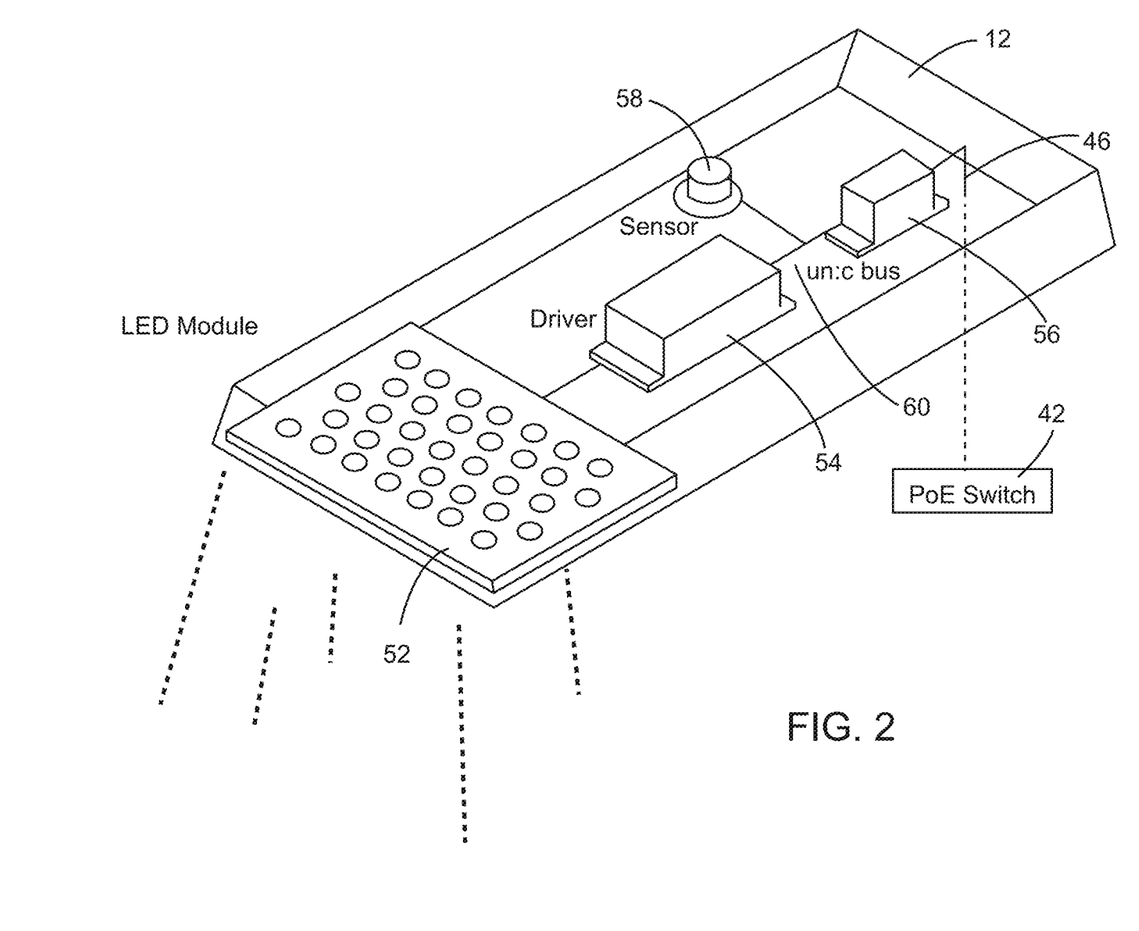
FIG. 2 illustrates an exemplary luminaire module that may be used in the building technology system depicted in FIG. 1.

The local area network in FIG. 1 will typically include wired luminaire modules 12 as described in FIG. 2, but can optionally include wireless luminaire modules 12W as well. In FIG. 1, a link server 18 is connected by line 20 to a router 22 or switch part of a local area network infrastructure. The link server 18 is a gateway and termination point for a secure connection tunnel using a secure web socket to connect to a dedicated cloud server. The web socket will remain open for direct 2-way communication between a cloud server and the link server In FIG. 1, for purposes of illustration, the link server 18 and the router 22 are located at the site of the building, and the link server 22 is a gateway for the building technology system 10 from the internet 26. The invention can be implemented, however, with other computing hardware including systems that use multiple gateways, routers, switches and access points as is common in art. In accordance with the embodiment of the invention shown in FIG. 1, application software on the link server 18 manages the operation of physical devices such as luminaires 12, 12W, sensors 14 and actuators like window shade motors. The software on the link server 18 comprises, in part, a relational database and a relational database management system such as SQL from Oracle. FIG. 1 shows a relatively small number of luminaire modules 12, 12W and other physical devices 14, 16 for purposes of illustration. In practice, the luminaire modules 12, 12W and other physical devices 14, 16 shown in FIG. 1 could be representative of physical devices for a single room and an adjacent hallway in a large building. It should be understood, however, that the invention is directed to facilitating the commissioning of very large number of physical devices. For example, as illustrated in FIG. 3, a standard room 72 on one floor 64 of a hotel building might have nine lights, two motion sensors and three control switches, totaling fourteen network addressable physical devices for the room, and there are over twenty rooms on the floor, and hallways and waiting areas as well. A customer portal customer portal 32 provides internet access to the business technology system and software applications on the link server 18, although applications on the link server 18 could also be accessed over the local area network if desired.

As shown in FIG. 1, the Net4More® IP lighting system typically includes a cloud server 28, which in this embodiment contains commissioning software. A mobile commissioning device 30, such as a tablet, laptop or smart phone, wirelessly connected to the internet, desirably contains a software application configured to assist in identifying the location of connected physical devices on the system layout, and assist in binding the appropriate network address to the respective physical device. As discussed in more detail below, the software application on the mobile commission device 30 is also configured to provide a user interface for planning the commissioning of installed physical devices. For example, the tablet 30 can access the internet 26 and the commissioning application on the link server 28, e.g., via a WiFi access point 34 on the router 22, or via a cellular or satellite connection.

Still referring to FIG. 1, a Power over Ethernet (PoE) switch 42 receives mains power through line 40 and communicates data and provides power over lines 46 to the respective communications modules for the luminaires 12 and communications modules 44, 48 for other physical devices such as the stand-alone sensor 14 and the switch interface 16 shown in FIG. 1. The PoE switch 42 is connected via line 50 to network router 22 which, as mentioned is connected to the link server 18 and includes a WiFi access point 34 for communication with WiFi enabled devices. Alternatively to a PoE connection, the control modules for the physical devices can be connected to a standard Ethernet connection, assuming power is also supplied to the devices.

Each wireless luminaire module 12W in FIG. 1 includes a low power transceiver 36 that communicates wirelessly with a multi-channel, low power access point 38 connected to the PoE switch 42, and indirectly connected to the router 22 through line 50 and the link server 18 through line 20. Mains power is supplied to each of the wireless luminaires 12W but the architecture shown in FIG. 1 does not require for example a wired Ethernet connection to the luminaire modules 12W, or a WiFi connection to the luminaire module 12W. Wireless communications in this aspect of the system are preferably according to the Thread networking protocol which is an IPv6 based networking protocol for Internet of things (IoT) "smart" home automation devices to communicate on a local wireless mesh network. The Thread protocol uses 6LoWPAN, which in turn typically uses IEEE 802.15.4 wireless protocol with mesh communication although the Thread protocol can operate on other radio connections including 802.11 (WiFi). The Thread protocol is IP addressable, with cloud access and AES encryption. It can support many devices in one local network mesh.

FIG. 2 illustrates an exemplary architecture for the luminaire modules 12 using the Net4More® technology. In FIG. 2A, the luminaire 12 contains an LED module 52 having an array of LED lights. The luminaire 12 also includes an LED driver 54, a communications module 56, and one or more environmental sensors 58. The LED driver 54, and the one or more sensors 58 are connected to bus 60, and in turn to communication module 56. The inter-luminaire bus 60 is desirably a un:c bus. The control module 56 is designed to control the LED driver 54 and the LED module 52, for example, on the basis of input signals consisting of data signals transmitted to the communication module 56. The communication module 56 can include a WiFi transceiver to communicate wirelessly over a WAN; however, as discussed above it is contemplated that the communication module 56 will typically communicate over a wired connection such as an Ethernet connection, or more preferably over a connection 46 to a Power over Ethernet (PoE) switch 42, in contrast to a wireless or wired network connection and a separate mains power line.

The communication module 56 has a processing unit, such as an ARM Cortex based microcontroller with a suitable size of flash and RAM memory. Various sensors 58 can be employed, e.g. light sensor, temperature sensor, motion sensor, smoke sensor or the like. The communication module 56 can be designed to actuate the light source on the basis of the ambient light condition sensed by the sensor 58, time of day, and possibly also on the basis of the temperature sensed by a temperature sensor, on the basis of sensing motion of nearby objects and/or on the basis of smoke density, etc. It is also possible to remotely program and control the lighting unit as a result of communication over the network with the communication module 56.

FIG. 3 depicts an exemplary master layout 62 of a floor 64 in a large building complex as illustrated on a tablet 30 or other computing device implementing commissioning software in accordance with one embodiment of the invention. The floor 64 includes several rooms along a hallway 66, a waiting area 68 for an elevator and a stairwell 70. The floor 64 includes several standard rooms 72-89, a double deluxe room 90, a super single room 91, and a corner penthouse room 92. The floor also includes an emergency exit 93 hallway. As illustrated in FIG. 3, the same type of physical devices are installed in each of the standard rooms 72-76, 78-89 and, in accordance with the invention, the installed physical devices in the redundant standard rooms 72-76, 78-89 on floor 64 can be commissioned and provisioned according to the same plan in terms of the logical functions of the respective physical devices. The layouts of devices in rooms 74, 76, 78 and 80 on the same side of the hallway on floor 64 as room 72 are the same as the layout of room 72, and that the layouts of rooms 73, 75, 79 and 81 on the same side of the hallway 64 are a mirror image of the layout of room 72. It is noted that room 77 is a standard single room; however, it has a different layout than rooms 72-76, 78-89. The rooms 82-89 on the other side of the hallway 64 are facing the opposite direction as room 72. When viewed from the hallway into the respective room, the layouts of rooms 83, 85, 87, 88 and 89 are the same as the layout of room 72 (facing the other direction) and the layouts of rooms 82, 84 and 86 are the mirror image of the layout of room 72 (facing the other direction).

The commissioning software enables the user to define sections 72S-76S, and 78S-89S on the master layout 62. In FIG. 3, the user has defined standard rooms 72-76, 78-89 as sections 72S-76S, and 78S-89S. Section 72S is depicted on the master layout 62 with a solid line, whereas sections 72S-76S, and 78S-89S are depicted with dashed lines. Sections 72S-76S, and 78S-89S, corresponding to the standard rooms 72-76, and 78-89 on the floor 64, are defined for purposes herein as a set of redundant sections. As mentioned, the sections are defined by the user during the planning phase and will typically correspond to rooms, hallways, stairwells or other areas of the property, however, sections can be defined as the user desires in the exemplary embodiment of the invention.

As mentioned previously, room 72 illustrates virtual devices in section 72S, namely nine virtual luminaires, two virtual motion sensors and three virtual control switches, totaling fourteen virtual devices for the section 72.

Figure 4:
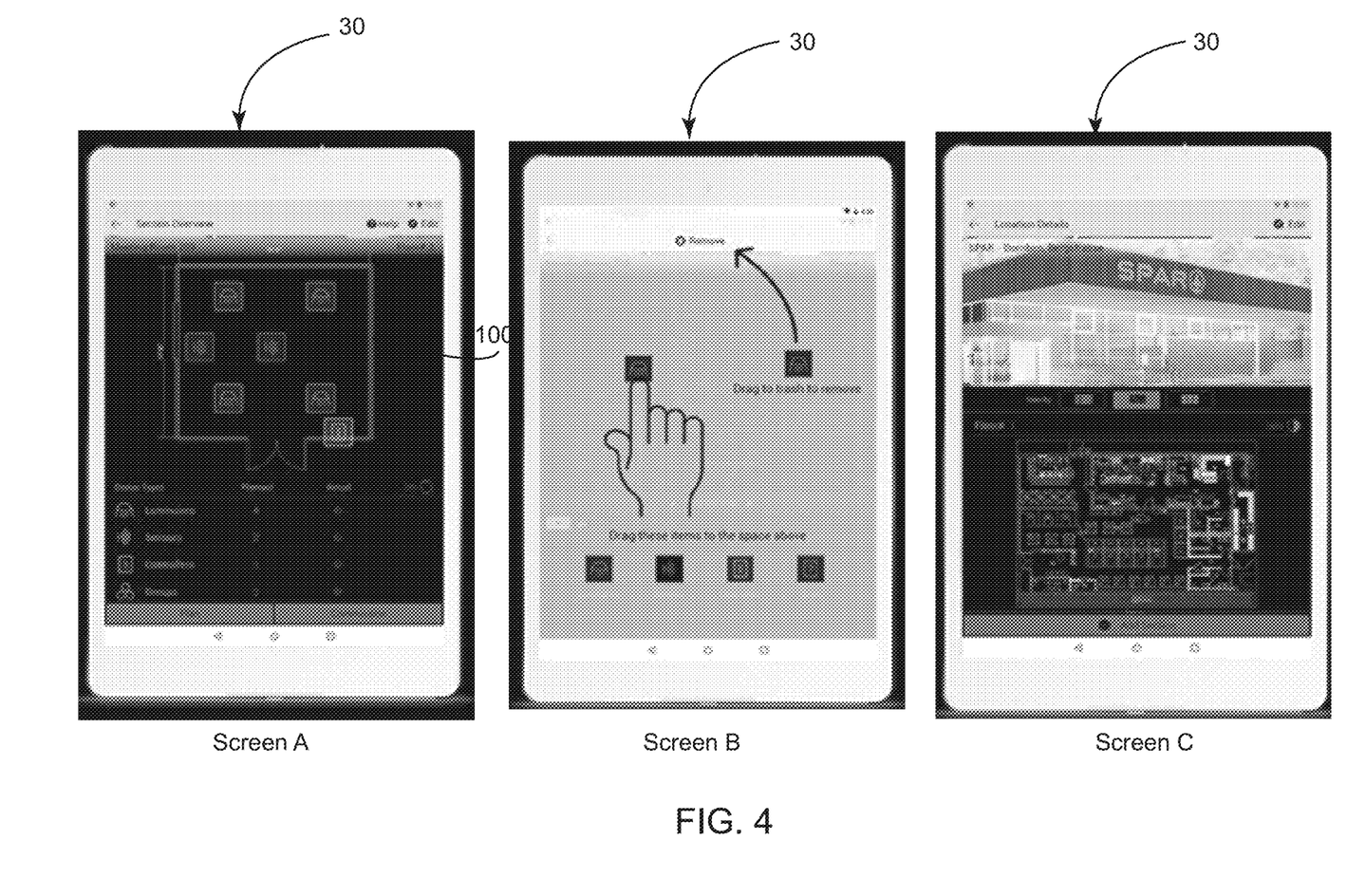
FIG. 4 illustrates screens on a tablet with an exemplary commissioning software application.

FIG. 4 illustrates screens on a tablet 30 with an exemplary commissioning application, showing screens A-C which are used during the planning step. Screen A is a visual object representation of a virtual section 100 corresponding to, e.g., section 72S in FIG. 3. In screen A, the user is able to set the dimensions of the virtual section 100, and drags icons representing luminaires, sensors, and room controllers into the virtual section 100. Screen B indicates that icons/virtual devices can be removed. Screen C shows an exemplary floor plan or master layout. During the planning stage, the commissioning software also enables the user to program logical functions of the devices. For example, in the Net4More® commissioning application, logical functions are programmed by defining groups of devices, and then defining scenes and recipes. In this paradigm, groups of devices are defined as input and output devices. For example, a set of lights can be grouped with a switch on a switch panel, and/or a motion sensor can be grouped with the sets of lights. Scenes relate primarily to the presentation of light and/or other environmental conditions, and recipes define the logic of activation. For example, the brightness or color of light may depend on time of day or ambient light sensors, or on whether television is being watched or light illuminates a work space, etc. Or, one can ensure that the light is only switched on if there is someone in the room, or that the heating and air conditioning are turned when the last person leaves the room, or that window blinds are closed when no one is present in the room. As should be apparent to one skilled in the art, programming logical functions can become complex. In addition, making adjustments after commissioning and provisioning can be cumbersome with prior art systems.

In accordance with the invention, the commissioning software is configured to create a plan of virtual devices and logical functions for a set of redundant sections. The virtual devices in the plan are selected to match the physical devices intended to be installed in or associated with the redundant sections. The commissioning software is able to create a reference copy of the plan of virtual devices for each redundant section selected by the user. Referring for example to FIG. 3, the plan of virtual devices can be programmed with respect to section 72S, and once completed a reference copy can be applied to redundant sections 72S-76S, and 78S-89S at the discretion of the user. As mentioned, the layouts of devices in rooms 74, 76, 78 and 80 on the same side of the hallway on floor 64 as room 72 are the same as the layout of room 72, and that the layouts of rooms 73, 75, 79 and 81 on the same side of the hallway 64 are a mirror image of the layout of room 72. Similarly, the rooms 82-89 on the other side of the hallway 64 are facing the opposite direction as room 72. When viewed from the hallway into the respective room, the layouts of rooms 83, 85, 87, 88 and 89 are the same as the layout of room 72 (facing the other direction) and the layouts of rooms 82, 84 and 86 are the mirror image of the layout of room 72 (facing the other direction). With this is mind, it is desirable for the commissioning software to include a mirroring option in which the reference copy is applied to a given section, albeit in a mirrored orientation. In this way, a section with a layout that is a mirror image of the plan can be considered redundant, and managed like the other redundant sections. On the other hand, if a plan needs to be altered or fundamentally changed by adding or removing devices or placing devices in a different location relative to the other devices, or by changing the logical function or programming of the devices in the room, then a new plan must be used and not a reference copy. For example, standard room 77, or the other rooms 90-92 on the floor 64 would require different plans. The term reference copy as used in this manner does not mean that the programming for section 72S is duplicated and applied to the other sections 72S-76S, and 78S-89S. Rather, it means that the respective sections 72S-76S, and 78S-89S relate to the plan of virtual devices and the logical functions programmed for the respective set of redundant sections. In this way, a change in the programmed logical function, such as changing the color temperature of an LED reading light in the standard rooms 72-76, and 78-89, can be made globally by changing the color temperature of a virtual LED reading light in the plan of virtual devices.

Initial planning steps can be completed, or largely completed, off-site and prior to binding the network addresses of the physical devices to the plan of virtual devices. The commissioning software is further configured to bind the network address of identified physical devices to the respective virtual devices in the reference copy of the plan for the respective section 72S-76S, and 78S-89S. The mobile commissioning device 30, e.g. tablet 30 operating commissioning application software, is configured to assist in identifying the location of connected physical devices and create a relation between the network address of the respective physical device and the corresponding virtual devices in the plan. The building technology system, e.g. the application software on the link server 18 managing the operation of physical devices, is provisioned based on the reference copies after the virtual devices in the respective sections are binded to the network addresses of identified physical devices.

The invention not only expedites the commissioning process but also reduces the technical complexity of the commissioning process during the planning stages and for the on-site technician. It helps to reduce programming errors during the planning and commissioning process, and facilitates after service and re-programming of the lights and other physical devices in the network.

Figure 5:
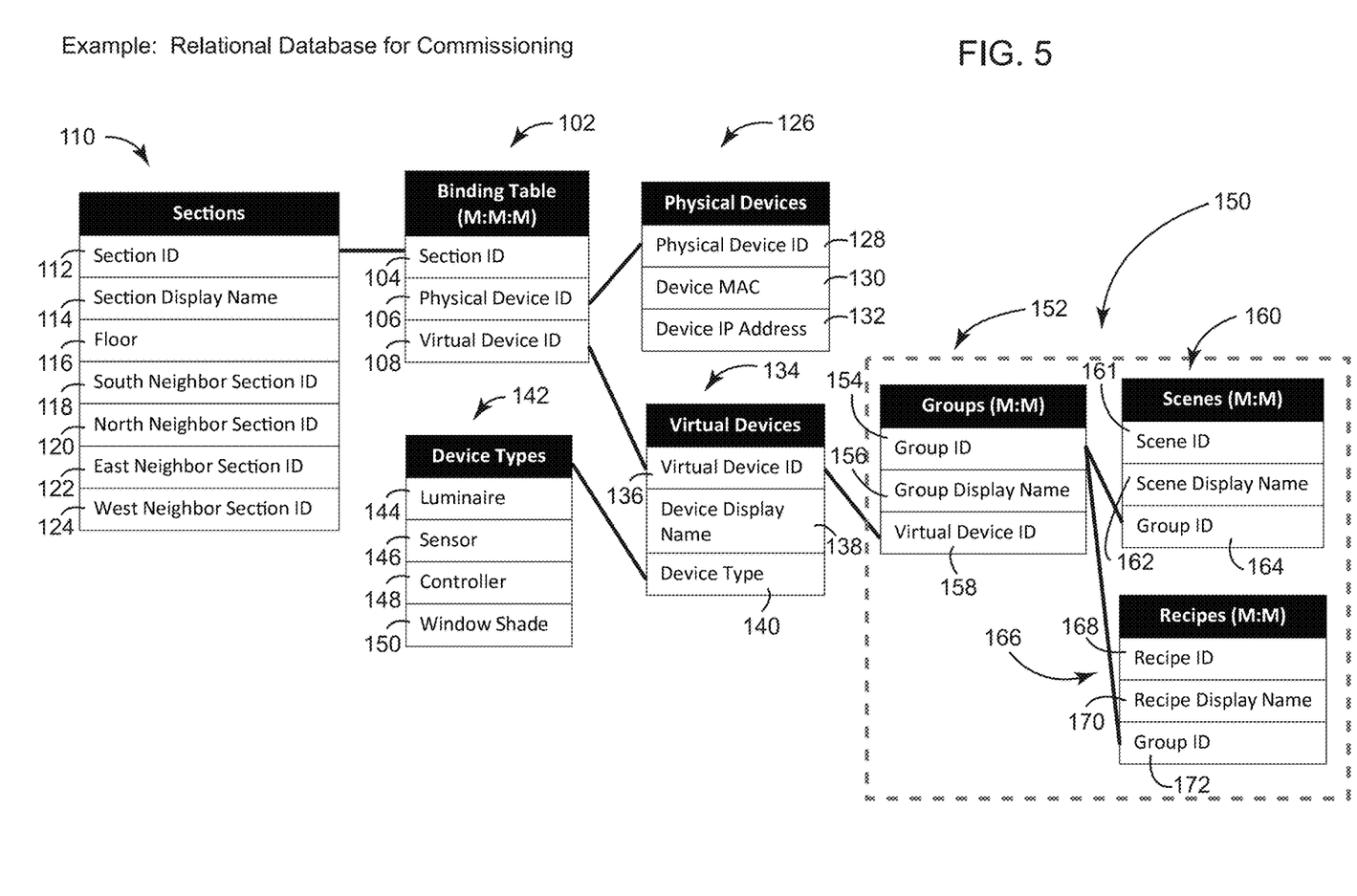
FIG. 5 is a schema showing tables in a relational database for commissioning physical devices in a building technology system in accordance with and exemplary embodiment of the invention.

FIG. 5 is a schema showing representative tables in a relational database for commissioning physical devices in a building technology system configured in accordance with an exemplary embodiment of the invention. The relational database including a "Binding Table" 102, which is a three-way binding table (M:M:M), that binds unique section ID keys 104 to unique physical device ID keys 106 and to virtual device ID keys 108.

The relational database includes a "Sections" table 110 containing unique section ID keys 112, which are desirably computer generated, and serve as a primary key for each section, e.g. 72S-89S, to which the plan of virtual devices is binded. The Sections table 110 also contains attributes sufficient to identify the location of the respective section 72S-89S on a master layout of the complex: e.g., a section display name 114, such as room number, floor 116 identification, and identification of neighboring sections 118, 120, 122, 124. The commissioning software will add the section ID 112, 104 to both the Sections table 110 and the Binding Table 104 when the user instructs the software to create a reference copy of the plan.

The relational database for commissioning in FIG. 5 includes a "Physical Devices" table containing unique physical device ID keys 128 which serve as a primary key for each physical device. The Physical Devices table 126 includes attributes sufficient to define the network address of the physical device identified by the respective ID key 128, e.g., attributes of IP address 130 and MAC address 132 if the system is designed to accommodate both types of network addresses. The attributes of the installed physical devices can be entered during the planning stage prior to the on-site commissioning steps. During on-site commissioning, when the location of a physical device is identified, the commissioning software enables binding of the physical device to the appropriate section 72S-89S and the appropriate virtual device by entering the Physical Device ID 128, 106 in the Binding Table 104, in addition to being in the Physical Devices table 126.

The relational database for commissioning in FIG. 5 also includes a "Virtual Devices" table 134 containing virtual device ID keys 136 which serve as a primary key for each of the virtual devices in the plans for the sets of redundant sections. The Virtual Devices table 134 shown in FIG. 5 contains the device display name 136 as an attribute, and the device type 140 pointing to the "Devices Types" table 142 listing for example, luminaire 144, sensor 146, controller 148 and window shade 150 as attributes. The relational database for commissioning in FIG. 5 further includes one or more logical function tables 150 for managing the logical functions programmed in the plans for the sets of redundant sections. The appropriate virtual devices ID key 136 in table 134 binds the respective virtual device to the respective logical functions programmed by the user when creating the plan for the set of redundant sections. In FIG. 5, more specifically, the relational database for commission includes a "Groups" table 152, a "Scenes" table 160 and a "Recipes" table 166. The Groups table 152, having many-to-many cardinality (M:M), contains unique group ID keys 154 which serve as a primary key for each grouping of virtual devices in the plan for the set of redundant sections. It further includes a group display name 156 as an attribute for each group, and virtual device ID keys 158 which serve to bind the respective virtual device to the respective grouping in the plan (via the entry of virtual device ID keys 136 in Virtual Devices table 134). The Scenes table 160 contains scenes ID keys 161 which serve as a primary key for each scene programmed and group ID keys 164 that bind the respective scene to the respective grouping of virtual devices. The Scenes table 160 also includes scene display name 162 as an attribute. The Recipes table 166 contains recipe ID keys 168 which serve as a primary key for each recipe programmed and group ID keys 172 to bind the respective recipe to the respective grouping of virtual devices in the plan for the set of redundant sections. In this way, a change in a programmed logical function in the plan of virtual devices, such as changing the brightness of a light during a certain time of day, can be implemented by changing the underlying scene and/or recipe in the plan. The changes are applied to all reference copies automatically and without the possibility of translation errors.

Figure 6A:
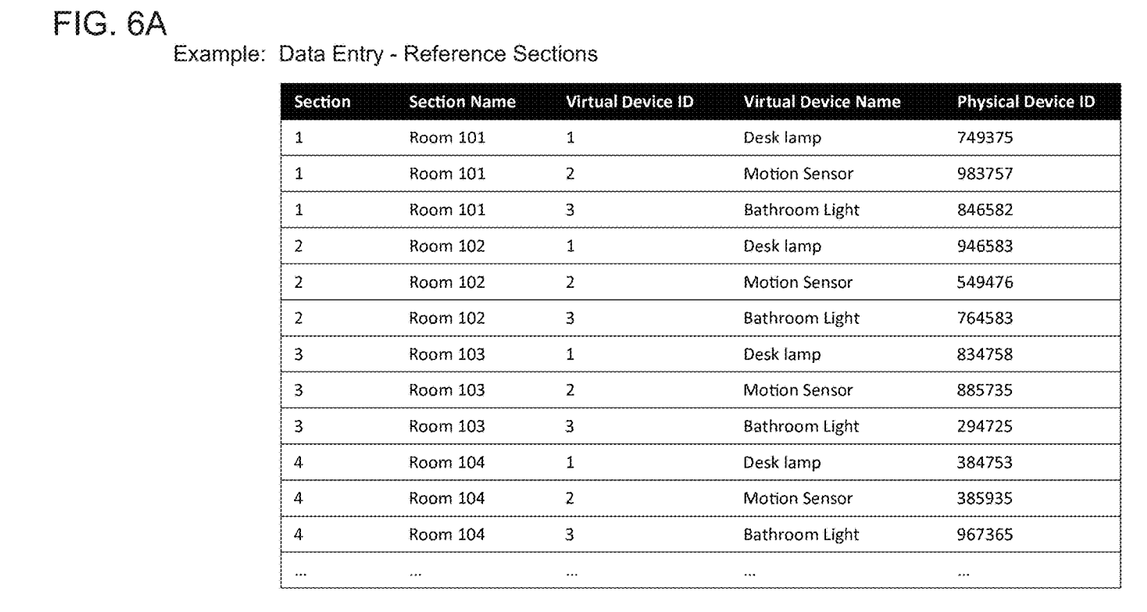
FIGS. 6A and 6B illustrate data entry during the commissioning process.
Figure 6B:
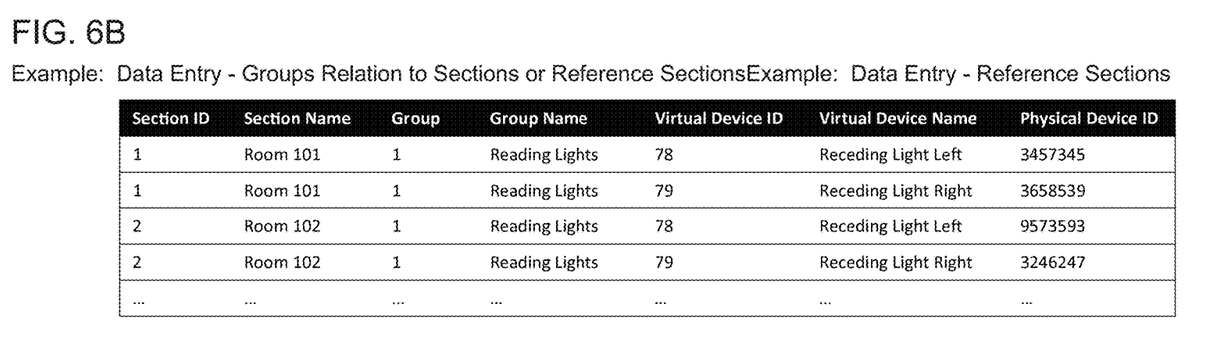

FIGS. 6A and 6B illustrate data entry during the commissioning process. FIG. 6A illustrates the commissioning of physical devices in Rooms 101-104. The first four columns from the left are filled automatically for the sections, i.e. Rooms 101-104, to which the reference copy has been applied. During the commissioning process, the technician enters the physical device ID numbers to bind the physical devices to the respective virtual devices in the relevant section, i.e. Rooms 101-104. FIG. 6B illustrates data entry in the form of physical device ID numbers again, however, in FIG. 6B group names are indicated in addition to virtual device names and section names. FIGS. 6A and 6B demonstrate the input of information necessary for commissioning while on-site is able to be done with ease.

Figure 7:
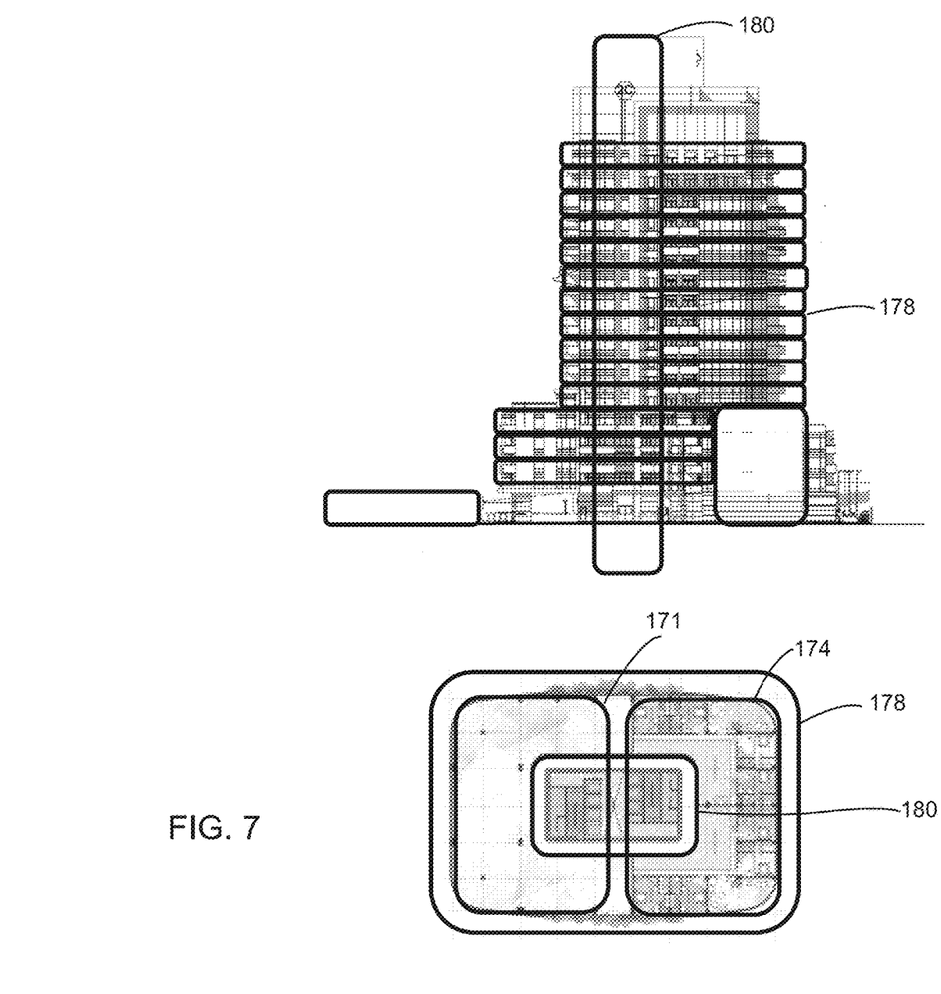
FIG. 7 illustrates cross-sections of a large building complex illustrating the use of sections in accordance with an exemplary embodiment of the invention.

The commissioning software as explained thus far has been explained. e.g., in connection with a single floor 64, see FIG. 3, of a building. It is contemplated that the commission software will have the ability to create several different plans of virtual devices for redundant and/or non-redundant sections of the building complex. FIG. 7 shows cross-sections of a large building complex illustrating the use of sections in accordance with one embodiment of the invention. Each floor in the building 178, and each half 174, 176 of each floor 178 in the building is designated as a separate horizontal section and the elevator and the elevator waiting areas are designated as a vertical section 180. When spaces and physical devices are covered by more than one section, the commissioning system implements a predetermined priority in case the plans for the respective sections contradict.

Figure 8:
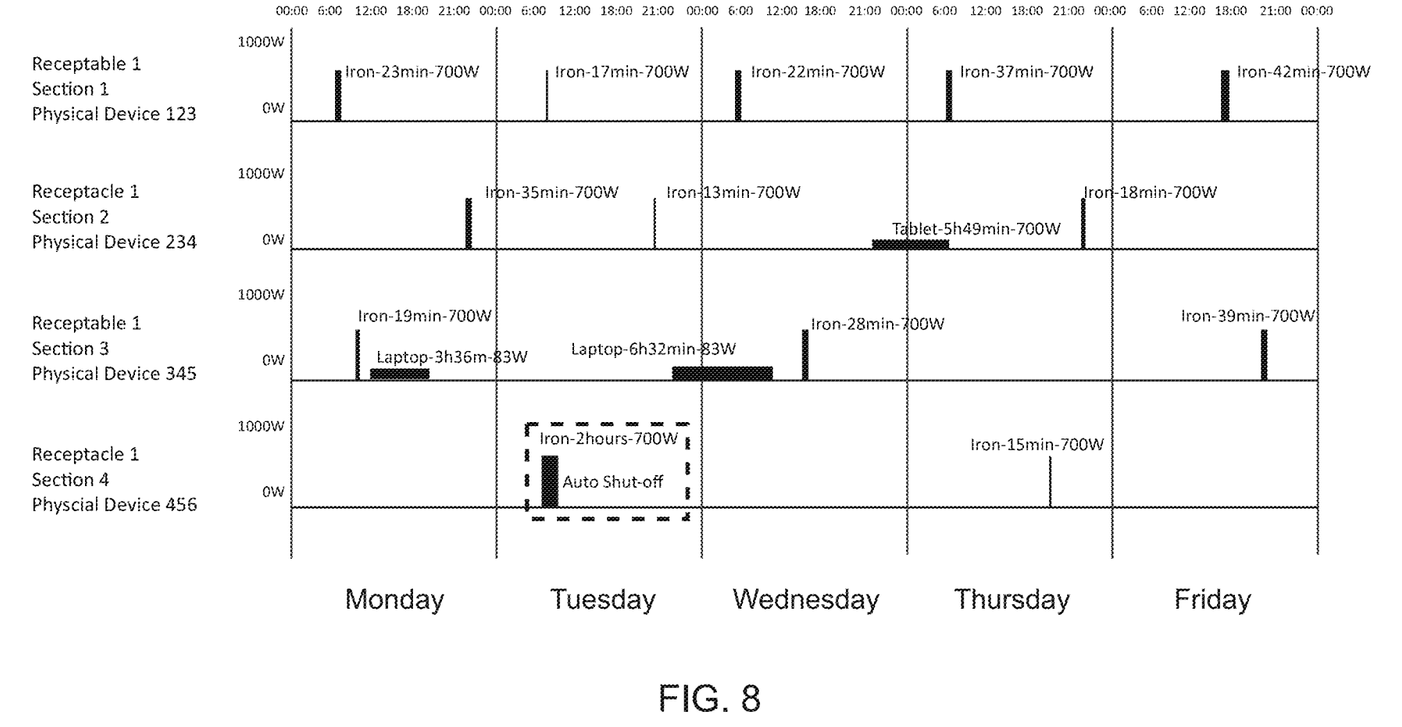
FIG. 8 is a schematic diagram illustrating the control of building technology devices in accordance with time series analytics.

The building technology system once operational can be used to collect data, and in turn control or manage various aspects of the building. As mentioned previously, motion sensors, perhaps in connection with time of day, can be used to determine whether lighting should be turned off or blinds should be closed or opened. Another example is the used of time series analytics to determine normal behavior, and identify abnormal behavior and possibly take preventative actions when dangerous abnormal behavior is identified. FIG. 8 is a schematic diagram illustrating an example of controlling a building technology device in accordance with time series analytics. Assuming that each hotel room has an energy monitor in the vicinity of an ironing board, the top time series in FIG. 8 shows that, over the course of several days, typical energy use for ironing is about 700 W and typically about 20 minutes and rarely above 40 minutes. The second time series from the top shows similar behavior for ironing, and also shows a tablet using much less power but for a longer time period. The third time series from the top shows similar behavior for ironing, and also shows a laptop using substantially less power than the iron but again for a longer time period. Based on the collected data, the abnormal behavior for ironing can be defined as, e.g., power consumption above 840 W (120% threshold above normal power consumption for iron) or power consumption above 500 W for longer than two hours. If abnormal behavior is detected, then the building technology system will turn off the socket. The fourth time series from the top shows abnormal behavior being detected on Tuesday morning, which in turn results in the building technology system automatically will turning off the socket until the system is reset. Desirably, the building technology system includes a self-learning database which is capable of identifying normal behavior from abnormal behavior, and set control thresholds defining when to take action based on abnormal activity.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations, systems, and method steps described herein10 may be used alone or in combination with other configurations, systems and method steps. It is to be expected that various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

What is claimed is:
1. A building technology system for a large property complex, the system comprising:
an addressable data network comprising physical devices and a building control system, wherein the physical devices include at least luminaires, sensors and room controllers connected to the addressable data network, and each of the physical devices has a unique network address; and wherein the building control system is connected to the addressable data network and contains application software programmed to manage the logical functions of the physical devices, and a commissioning software that presents a master layout of the large property complex with user-defined sections of the property complex, said commissioning software configured to enable a user to create one or more virtual sections comprising virtual devices and the logical functions for the virtual devices in the one or more virtual sections;

wherein each of the user-defined sections on the master layout is bound to one of the virtual sections, and designates a given user-defined section of the user-defined sections as redundant with another user-defined section of the user defined sections to create one or more sets of redundant sections, wherein each of the user-defined sections in a given set of redundant sections is bound to a corresponding virtual section; and wherein the commissioning software uses a relational database to bind the unique network addresses of the physical devices to the virtual devices in the virtual sections; and a mobile commissioning device including a graphical user interface that provides access to the commissioning software and is configured to assist in identifying the location of connected physical devices and binding the unique network addresses of the physical devices to the virtual devices in the virtual sections;

wherein the building control system is provisioned based on the one or more virtual sections after the virtual devices are bound to the unique network addresses of the physical devices in each of the user-defined sections.

2. The system according to claim 1 wherein the relational database includes a binding table (M:M:M) that binds unique section ID keys to unique physical device ID keys and to virtual device ID keys.

3. The system according to claim 2 wherein the relational database in the commissioning software further includes a sections table including said unique section ID keys serving as a primary key for each section, and at least attributes sufficient to identify a location of the respective section on the master layout of the large property complex.

4. The system according to claim 2 wherein the relational database in the commissioning software further includes a physical device table containing said unique physical device ID keys which serves as a primary key for each physical device, and at least the attributes of IP address and/or MAC address.

5. The system according to claim 2 wherein the relational database in the commissioning software further includes:

a virtual device table containing said virtual device ID keys which serve as a primary key for each of the virtual devices in the one or more virtual sections; and one or more logical function tables for managing the logical functions programmed in the one or more virtual sections and said virtual device ID keys which serve as a binding key to bind the virtual device to the logical functions programmed in the one or more virtual sections.

6. The system according to claim 5 wherein said one or more logical function tables for managing the logical functions programmed in the one or more virtual sections comprises:

a groups table (M:M) containing at least unique group ID keys which serve as a primary key for each grouping of virtual devices in the one or more virtual sections and said virtual device ID keys which serve as a binding key to bind the virtual device to said each grouping in the one or more virtual sections;

a scenes table (M:M) containing at least unique scenes ID keys which serve as a primary key for each scene programmed for virtual devices in the one or more virtual sections and said group ID keys which serve as a binding key to bind said scene to said each grouping of virtual devices in the one or more virtual sections; and a recipes table (M:M) containing at least unique recipe ID keys which serve as a primary key for each recipe among virtual devices in the one or more virtual sections; and said group ID keys which serve as a binding key to bind said recipe to said each grouping in the one or more virtual sections.

7. The system according to claim 2 wherein the relational database in the commissioning software includes one or more tables listing at least the following device types: luminaire, sensor, section controller.

8. The system according to claim 1 wherein the commissioning software applies a given virtual section to another redundant section in the large property complex in response to receiving an instruction to do so through a user interface.

9. The system according to claim 1 wherein the mobile commissioning device is a tablet.

10. The system according to claim 9 wherein the mobile commissioning device is a tablet that communicates with a cloud server, which in turn communicates with the building control system comprising one or more gateways to the internet, in order to provision the building control system based on the one or more virtual sections after the virtual devices in the one or more virtual sections are binded to the network addresses of identified physical devices.

11. The system according to claim 1 wherein the one or more gateways to the internet comprise a link server.

12. The system according to claim 1 wherein the commissioning software further comprises a mirroring option in which a given section is included in a set of redundant sections, according to a mirror image layout of the one or more virtual sections.

13. The system according to claim 1 further comprising a data acquisition system that collects time series data from identified physical devices in or associated with user-defined sections of the building; and a computer learning system that identifies abnormal behavior based on the collected time series data and sets one or more threshold values for the identified abnormal behavior; wherein the building technology system controls physical devices in the building in response to the collected time series data meeting or surpassing said one or more threshold values.

14. The system according to claim 1 in which the user-defined sections are defined by the user using a user interface on the mobile commissioning device.

* * * * *